March 5, 1968 W. L. CONNOLLY 3,371,677
FLUID FLOW CONTROL DEVICE
Filed July 2, 1964 4 Sheets-Sheet 1
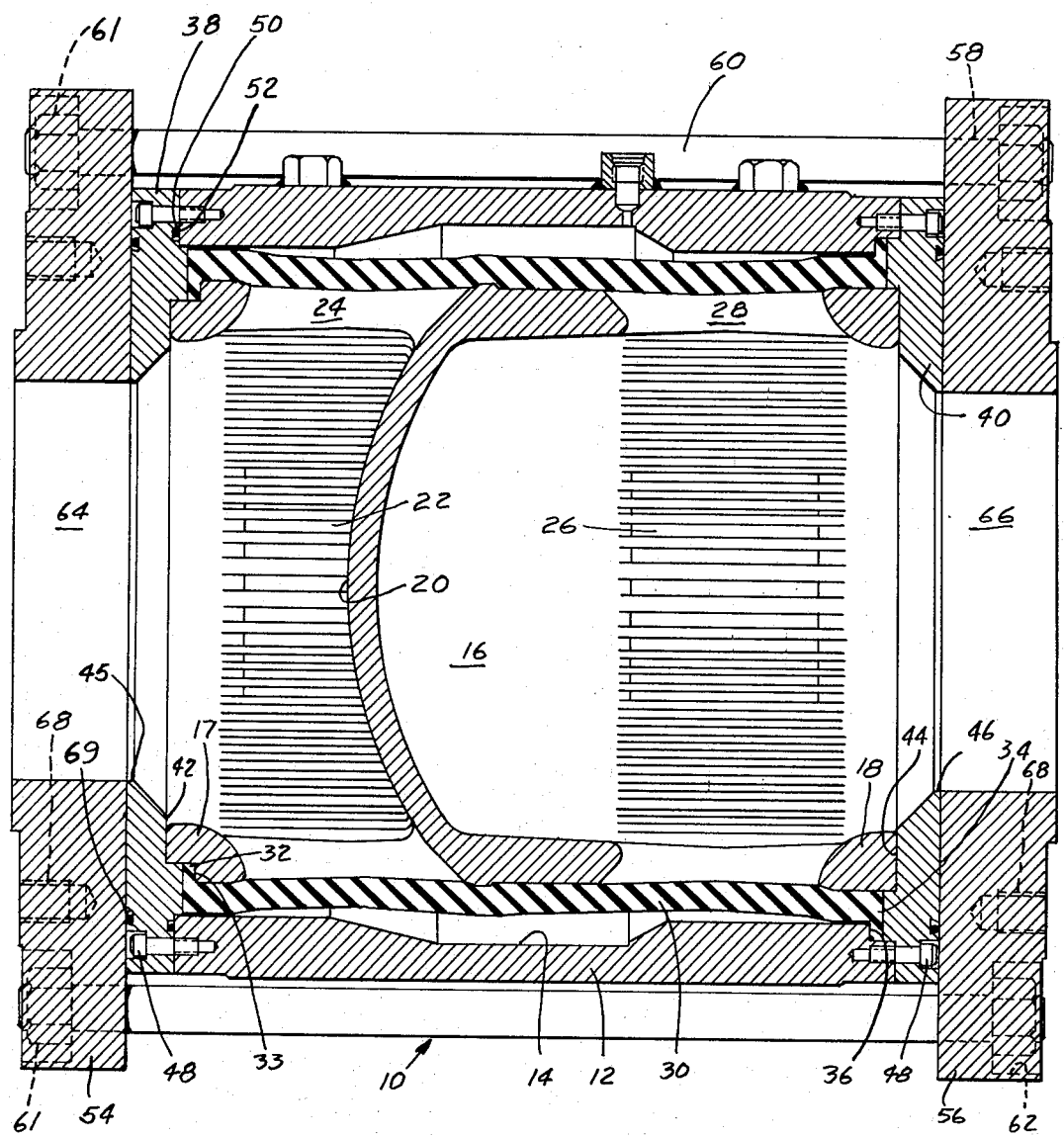
FIG-1-
INVENTOR.
WALTER L. CONNOLLY
BY Edward B. Gregg
ATTORNEY

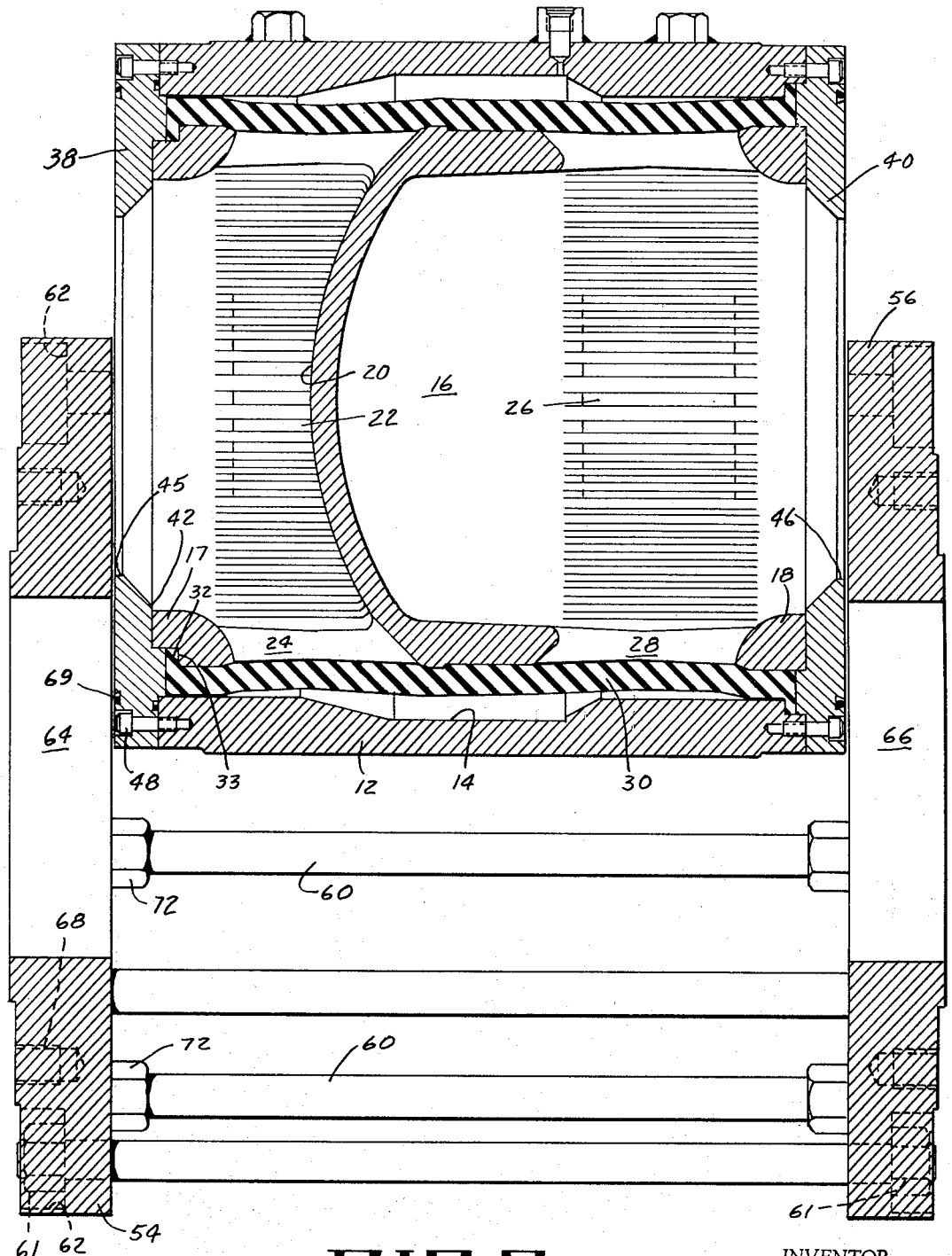
FIG-2-

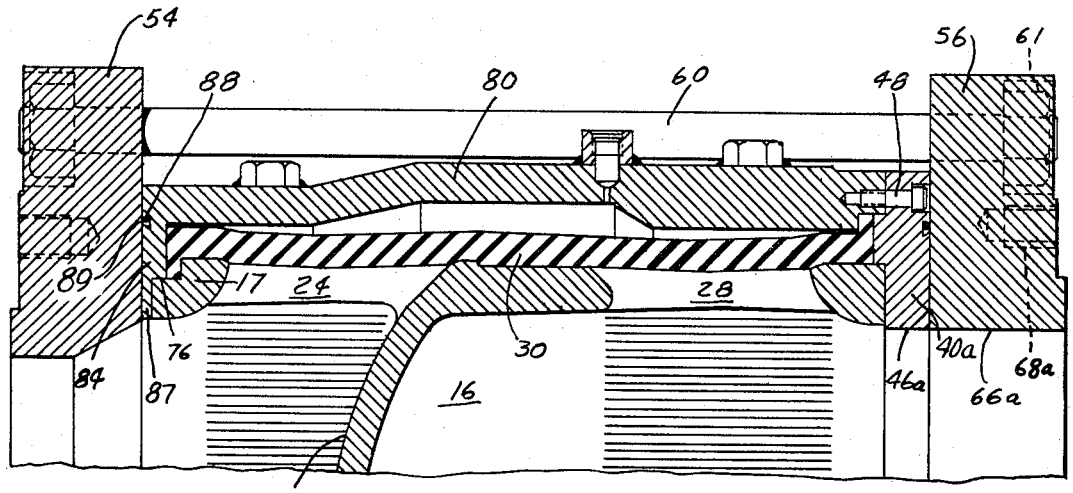
FIG-3-
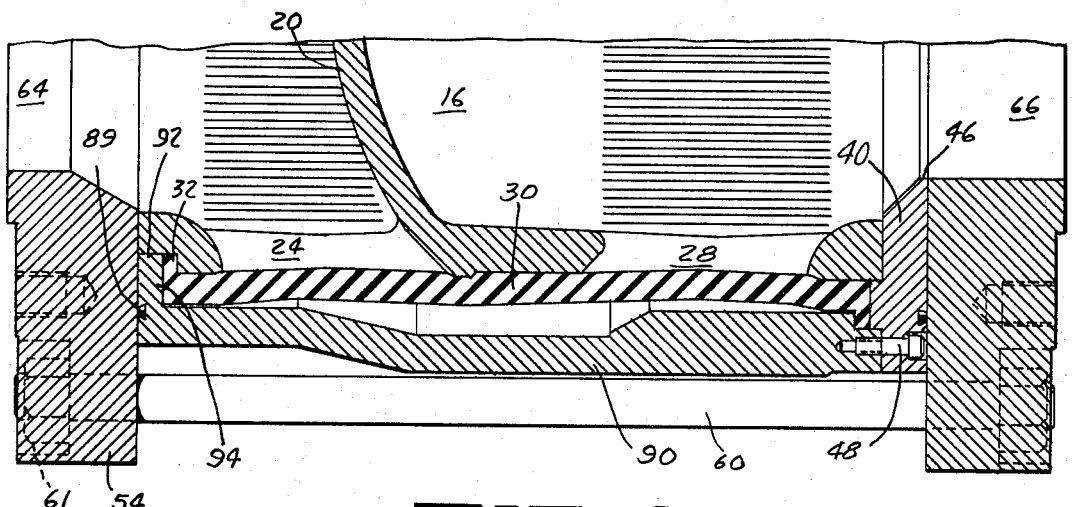
FIG-4-

March 5, 1968 W. L. CONNOLLY 3,371,677
FLUID FLOW CONTROL DEVICE
Filed July 2, 1964 4 Sheets-Sheet 4
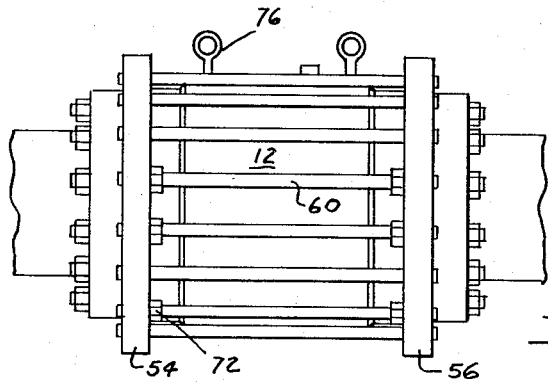
FIG-5-
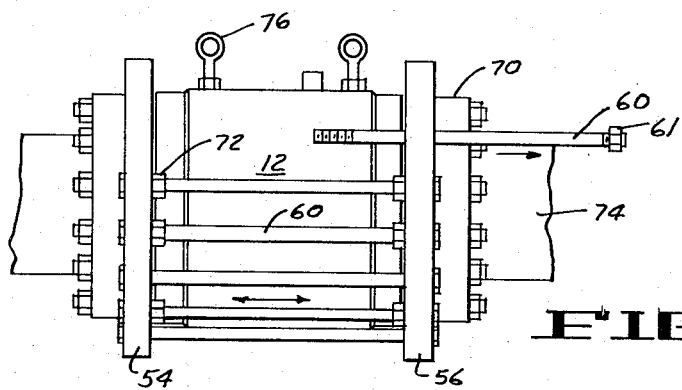
FIG-6-
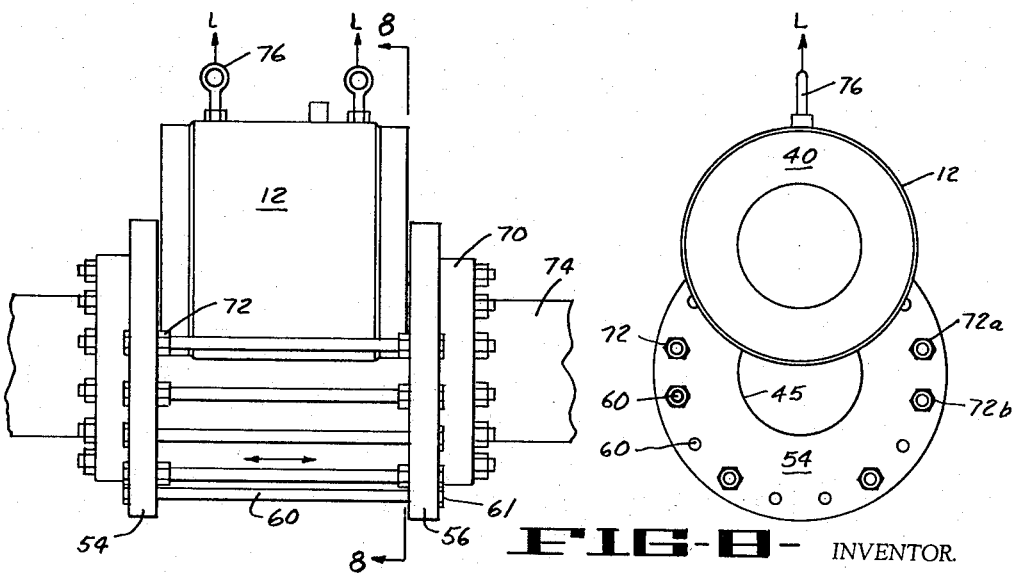
FIG-7-
FIG-8-
INVENTOR.
WALTER L. CONNOLLY
BY Edward B. Hagy
ATTORNEY United States Patent Office 3,371,677
Patented Mar. 5, 1968

3,371,677
FLUID FLOW CONTROL DEVICE
Walter L. Connolly, Orinda, Calif., assignor to Grove Valve and Regulator Company, Oakland, Calif., a corporation of California
Filed July 2, 1964, Ser. No. 379,805
5 Claims. (Cl. 137—315)

This invention relates to a fluid flow control device and, more particularly, to expansible sleeve type valve that is fabricated from standard structural materials.

Fluid flow control valves of the type disclosed in United States Patent No. 2,353,143 granted July 11, 1944, to Austin U. Bryant generally include a cast body with integral flanges or the like for connection to a pipeline. Supported within the body is a sleeve-like core having slots around its circumference with an intermediate barrier across the interior of the core sleeve to prevent direct fluid passage through it. Snugly carried on the outside of the core and sealed at its ends within the housing is an expansible sleeve. In operation, when the fluid pressure within the expansible sleeve exceeds a control pressure that is maintained around it, the sleeve expands outward to permit the flow of fluid through the slots at the inlet end, around the barrier, and back through the slots at the outlet end to discharge. Thus, the fluid passing through the regulator is at a pressure controlled by the pressure of fluid it must overcome to expand the sleeve.

Such valves have been very successful and reliable in operation but some difficulty has been experienced in disassembly and reassembly, particularly in the periodic maintenance inspection and the replacement of worn components such as the expansible sleeve. This is particularly true where the expansible sleeve valve is used in pipelines of medium to large size. In such installations, it has been necessary to disconnect the regulator body completely from the pipeline leaving an open gap in the pipeline which may reduce in size as a consequence of thermal expansion thus adding to the problem of replacing the valve after inspection.

It is, therefore, an object of this invention to provide an expansible sleeve type of regulator that may be removed from and then replaced back into a pipeline while maintaining the desired pipeline gap for such removal and replacement.

It is a further object of this invention to provide an expansible sleeve type valve having end plates that may be coupled into a pipeline, and a main body cylinder that may be removed from between the plates while they are held in fixed spaced relationship.

Another disadvantage of the cast body type of expansible sleeve valve resides in the limitation imposed upon the manufacturer with respect to the size range in which such valves may be produced. Experience has shown that for desired flow capacity, the slotted core on which the expansible sleeve is supported should be at least one and one-half times the diameter of the incoming pipe. Consequently, it would be feasible to provide the valve with an outlet flow passage of a larger diameter than that of the incoming flow passage and this is particularly desirable when the valve is used as a regulator. However, it is not practical from a commercial standpoint to stock valve bodies having a wide range of outlet flow passage sizes for a given inlet size and such valve housings are normally cast with outlets of the same standard pipe diameter as that of the inlet.

It is, therefore, an object of this invention to provide a valve construction which permits an interchangability of elements to accommodate varying pipe sizes for a given valve body.

It is a further object of this invention to provide a valve construction which permits an oversize discharge where pipeline conditions permit.

In carrying out this invention, I provide a generally cylindrical main body portion that is formed with an enlarged internal diameter intermediate its ends to form an outer chamber around the resilient sleeve in order to accommodate expansion. A slotted support core or sleeve is positioned within the cylinder and carries the expansible sleeve. A dam or barrier extends across the core intermediate its ends to prevent the flow of fluid directly through the sleeve and its outer surface is normally snugly embraced by the resilient sleve to effect a seal around it. With the core and expansible sleeve in place within the cylindrical body, a pair of end plates of standard plate material having flow openings therethrough are bolted or otherwise secured to the body to secure the components together. Finally, a pair of connector plates, each with flow openings and a series of tapped holes for flange connection into a pipeline are tightly clamped against the end walls by a series of long studs that extend between them, a resilient seal being provided between each end wall and the connector plate to render the body bubble tight. Since the end walls and connector plates are formed of standard plate material and are not integral with the main body cylinder, they may be bored and tapped after fabrication of the rest of the regulator and custom manufactured to meet the particular requirements of the pipeline contractor. This is possible because the slotted core sleeve is preferably at least one and one-half times the diameter of the incoming pipe. Hence, if desired an outlet pipe of a size corresponding to that of the core can be provided instead of reducing back down to a pipe of the inlet size. Therefore, if pipeline specifications permit such flexibility, the outlet end wall and connector plate can be bored for a larger size pipe and tapped to conform to the coupling flange thereof. Additionally, the end walls and connector plates, being of plate material, can be of selected thicknesses to achieve the desired over all face to face dimension for the desired valve size.

As a significant feature of this invention, a second series of nuts is provided on certain of the elongated studs to engage the inner, facing surfaces of the connector plates, such threaded nuts being omitted from most of the studs on one side of a center line of the bolt circle. Thus, when it is desired to replace or repair a component of the regulator, the inner nuts may be threaded tightly against the connector plates to force them apart slightly and compress adjacent pipeline sections for an amount sufficient to provide a slight clearance on both sides of the main body cylinder. Then, with the studs removed from that half of the bolt circle where the inside nuts have been omitted, a clear space is provided for transverse removal of the main body cylinder.

Other objects and advantages of this invention will become apparent from the specification following when read in conjunction with the accompanying drawings wherein:

FIG. 1 is a vertical section view of an expansible sleeve regulator embodying features of this invention;

FIG. 2 is a vertical section of the regulator of FIG. 1 with the main body cylinder partially removed;

FIGS. 3 and 4 are partial vertical section views showing other forms of my invention;

FIGS. 5, 6 and 7 are elevation views of a regulator constructed according to my invention in various stages of removal from a pipeline; and FIG. 8 is a section view taken along line 8—8 of FIG. 7.

Referring now more particularly to FIG. 1, a preferred embodiment of regulator 10 includes a cylindrical main body member 12 which may be cast or otherwise formed with its inner surface recessed at 14 intermediate its ends to provide a central, enlarged chamber. Concentrically positioned within the main body cylinder is a core cage or sleeve 16 having inlet and outlet mounting rings 17 and 18 and a central barrier or dam 20 which prevents flow of fluid directly through the sleeve. A series of slots 22 formed between ribs 24 provide access from the inside of the core to the outside at the upstream side, and a second series of slots 26 formed between ribs 28 form a means of reentry into the core at the downstream side. Carried on the support core, preferably under slight tension is a resilient expansion sleeve 30 having an inturned flange 32 at the inlet end engaging a shoulder 33 on the core inlet mounting ring, and an outturned flange 34 at the downstream end engaging over a shoulder 36 near the end of the main body cylinder 12.

The core 16, the resilient sleeve 30 and the main body cylinder 12 are assembled and positioned on end walls 38 and 40 where the end mounting rings 17 and 18 of the core are carried in recesses 42 and 44 that surround the upstream and downstream flow openings 45 and 46. The end walls are secured to the main body cylinder 12 as by means of cap screws 48 and, when so secured, they compress the inturned and outturned resilient sleeve flanges 32 and 34 slightly to seal between the end wall 38 and cage 16 at the inlet end and between the end wall 40 and the main body cylinder 12 at the outlet end. Preferably, an annular recess 50 is provided around the upstream end wall 38 in order to accommodate a suitable seal ring, such as the O-ring 52 to provide a fluid tight joint. While the flow openings 45 and 46 in the end walls are shown as of substantially the same diameter, it is apparent that the downstream end wall opening 46 may be enlarged within the limits imposed by the diameter of the core 16 and therefore, be adapted for a larger downstream pipeline.

Thus, it will be seen that the main body cylinder 12, the expansible sleeve 30, its supporting core or cage 16 and the end walls 38 and 40 form a complete and unitary assembly of separately produced components that may be fabricated to meet the requirements of the pipeline contractor.

Also shown in FIG. 1 are a pair of connector plates 54 and 56 which are provided with a circular series of holes 58 around the edges thereof to accommodate elongated studs 60 with threaded nuts 61 thereon being accommodated in counterbores 62 so as to leave the outer surfaces of the connector plates 54 and 56 free to facilitate insertion of the valve into a pipeline. Each of the connector plates 54 and 56 is formed from standard plate material and of thicknesses selected to provide the desired over all face to face dimension and each is bored centrally to provide inlet and outlet flow passages 64 and 66. Additionally, the connector plates are bored and tapped at 68 to accommodate cap screws or the like for connection of the regulator to a pipeline flange 70 as shown in FIGS. 5, 6 and 7. When the nuts 61 are tightened on the studs 60 while engaging the outer surfaces of the connector plates 54 and 56, they urge the plates together to clamp the cylinder 12 with end walls 38 and 40 between them. Then, suitable resilient seals 69 on the end walls provide a fluid tight structure.

On cetrain of the elongated studs, force-transmitting nuts 72 (FIG. 2) are also provided inside the connector plates 54, 56 to engage and force against their inner surfaces. As will be noted from FIGS. 5 to 8, the inner series of nuts 72 need be provided on only a few of the studs and are omitted from most of the studs on one side of a center line of the cylindrical body. In the embodiment shown, a pair of nuts 72a are provided in the top half of the circular connector plate to balance forces of those in the lower half 72b, and all of the inside nuts 72 cooperate when tightened to force the connector plates 54 and 56 by compressing a pipeline 74 to which they are connected. In practice, the outer nuts 61 are loosened on all studs 60 and completely removed from one end of those studs in the upper half circle on which no inner nut 72 is provided. Then, as shown in FIGS. 6, 7 and 8. with the studs 60 from the upper half circle removed, the second series of nuts 72 are tightened to force the connector plates apart enough to separate them from the main body cylinder 12 and provide sufficient clearance for removal of cylinder. Suitable means such as eye bolts 76 may be employed as a means to grasp the cylindrical body and a source of lifting power indicated diagrammatically by the arrows L may be applied to remove the main body cylinder from between the connector plates 54 and 56. The inner nuts 72 on the remaining studs 60 keep the flanges 70 of the pipeline in fixed spaced relationship with the main body cylinder 12 removed. After the necessary repairs have been effected, the main body cylinder can be replaced without difficulty into the accommodating space that has been maintained. Thereafter, the inner nuts 72 may be loosened and the remaining studs replaced and outer nuts 61 tightened to, once again, force the connector plates 54 and 56 into firm seating engagement with the end walls 38 and 40 on the outside of the main body cylinder to form a seal therewith.

Inasmuch as the main body cylinder may be manufactured separately, it is possible for a manufacturer to stock a sufficient quantity of the main body cylinders and postpone completion of the end walls until receipt of an actual order from a customer. Since, as has been hereinbefore explained, the core or cage is preferably at least one and one-half times the diameter of the inlet pipe, there is a certain range of outlet pipe sizes to which it may be connected. Therefore, the end walls can be manufactured to meet the required face to face dimension i.e., the overall axial length of the valve, and the inlet and outlet passage sizes. Specifically, the connector plates may be selected of thicknesses to meet the face to face dimension and bored and tapped to accommodate the internal diameter and flange circle of the inlet pipe and outlet pipe, respectively.

In the embodiment of FIG. 3, the main body cylinder 80 is cast with an inwardly depending flange 84 integral therewith at the inlet side eliminating the need for an inlet end plate. An annular recess 76 surrounding the flow opening 87 accommodates the inlet body support ring 17 of the cage or core 16 and an annular groove 88 formed in the outer surface of the flange accommodates a suitable seal member such as an O-ring 89 to seal the inlet connector plate 54. Thus, the entire body cylinder assembly is held together by the outlet side end wall 40a which is bolted to the end of the main body cylinder. It will be noted in FIG. 3 that the flow openings 46a and 66a are of larger diameter than the inlet openings and the outlet connector plate is tapped at 68a for attachment to a larger outlet pipeline.

In the embodiment of FIG. 4, the main body ring 90 is similar to that in FIG. 3 except that the internal cylindrical surface 92 of the depending flange inlet side 94 provides the support for the core cage 16. Again, cap screws 48 that engage in the outlet end wall 40 and the main body cylinder hold the assembly together to clamp the depending flange 94 and the inturned flange 32 between the core cage and the body ring at the inlet side and clamp the outturned flange between the end wall 40 and the body cylinder at the outlet side.

While this invention has been described in conjunction with preferred embodiments thereof, it is to be understood that modifications and changes therein may be made by those skilled in the art without departing from the spirit and scope of this invention which is defined by the claims appended hereto.

Having described my invention, I claim:
1. A valve structure comprising:
   a tubular main valve body band,
   a sleeve-like core having two axially spaced annular series of through slots around it mounted in spaced relationship within said main body band, a barrier across said core between said spaced series of slots blocking direct flow through said core, an expansible sleeve on said core, an inlet connector plate having an inlet passage therethrough, means on said inlet connector plate for attaching it to a pipe section, said core having an inner diameter larger than the diameter of said inlet passage, an outlet connector plate, means forming an outlet flow passage of selected internal diameter through said outlet connector plate, means on said outlet connector plate for connecting it to a pipe section of selected diameter, a series of aligned openings located on circles around the edges of said connector plates, a plurality of threaded elongated studs extending between said connector plates and through said openings, a plurality of nuts on said studs engaging the outer surfaces of said connector plates for forcing them into clamping engagement with said valve body, resilient seal rings between said connector plates and the ends of said valve body band, and a second series of nuts on certain of said studs for engaging the inner surfaces of said connector plates to force them apart, the remainder of said studs, when removed, providing sufficient space for removal of said valve body transversely of a center line of said aligned opening circles, said second series of nuts being distributed to engage the inner surfaces of said connector plates on both sides of said center line.

2. The valve structure defined by claim 1 wherein:

the diameter of said core is approximately one and one-half times the diameter of said inlet passage, and said outlet passage is larger than said inlet passage.

3. A valve structure comprising:

a tubular main valve body band, a sleeve-like core having two axially spaced annular series of through slots around it mounted in radially spaced relationship within said main body band, a barrier across said core between said spaced series of slots blocking direct flow through said core, an expansible sleeve on said core, an inlet connector plate having an inlet passage therethrough, means on said inlet connector plate for attaching it to a pipe section, an outlet connector plate, means forming an outlet flow passage of selected internal diameter through said outlet connector plate means on said outlet connector plate for connecting it to a pipe section of selected diameter, a plurality of threaded members around said connector plates for forcing them into clamping engagement with said valve body band, means on said body band spacing said expansible sleeve from said connector plates, and resilient seal rings between said connector plates and the ends of said valve body band.

4. The valve structure defined by claim 3 wherein:

the diameter of said core is approximately one and one-half times the diameter of said inlet passage, and said outlet passage is larger than said inlet passage.

5. A valve structure defined by claim 3 wherein:

said inlet and outlet connector plates are of selected thicknesses to provide, with said valve body band clamped between, a predetermined overall axial valve dimension.

References Cited

UNITED STATES PATENTS

| | | | |
|---|---|---|---|
| 2,331,291 | 10/1943 | Annin | 251—5 |
| 2,573,864 | 11/1951 | Moran | 251—5 |
| 2,622,620 | 12/1952 | Annin | 251—5 |
| 3,024,802 | 2/1962 | Stillwagon | 137—454.2 |
| 860,062 | 7/1907 | Rust | 137—454.2 X |
| 2,740,423 | 4/1956 | Stillwagon | 137—454.2 |

FOREIGN PATENTS 731,221  2/1943  Germany.

M. CARY NELSON, *Primary Examiner.*

A. ROSENTHAL, *Assistant Examiner.*